United States Patent
Matsuzawa et al.

(10) Patent No.: US 10,911,632 B2
(45) Date of Patent: Feb. 2, 2021

(54) IMAGE SCANNING DEVICE

(71) Applicant: Mitsubishi Electric Corporation, Chiyoda-ku (JP)

(72) Inventors: Taku Matsuzawa, Chiyoda-ku (JP); Daisuke Ohama, Chiyoda-ku (JP); Akira Daijogo, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/824,962

(22) Filed: Mar. 20, 2020

(65) Prior Publication Data
US 2020/0344377 A1    Oct. 29, 2020

(30) Foreign Application Priority Data
Apr. 26, 2019 (JP) ................. 2019-085472

(51) Int. Cl.
| | | |
|---|---|---|
| H04N 1/04 | (2006.01) | |
| H04N 1/12 | (2006.01) | |
| F21V 8/00 | (2006.01) | |
| G02B 5/02 | (2006.01) | |

(52) U.S. Cl.
CPC ......... *H04N 1/1295* (2013.01); *G02B 5/0278* (2013.01); *G02B 6/001* (2013.01); *G02B 6/0006* (2013.01)

(58) Field of Classification Search
CPC .. H04N 1/1295; G02B 5/0278; G02B 6/0006; G02B 6/001

USPC .................................. 358/484, 475, 509
See application file for complete search history.

(56) References Cited

U.S. PATENT DOCUMENTS

| | | | |
|---|---|---|---|
| 2011/0286699 A1 | 11/2011 | Sanada et al. | |
| 2015/0319329 A1* | 11/2015 | Matsuzawa | H04N 1/028 358/475 |
| 2019/0349495 A1* | 11/2019 | Matsuzawa | H04N 1/028 |
| 2019/0379801 A1* | 12/2019 | Matsuzawa | G03B 27/54 |

FOREIGN PATENT DOCUMENTS

| | | |
|---|---|---|
| JP | 2011-249020 A | 12/2011 |
| JP | 2011-253699 A | 12/2011 |

* cited by examiner

*Primary Examiner* — Cheukfan Lee
(74) *Attorney, Agent, or Firm* — Oblon, McClelland, Maier & Neustadt, L.L.P.

(57) ABSTRACT

An image scanning device includes a linear light source to illuminate a linear illumination position of a scan target with light, a lens body, and a sensor. The linear light source includes a light guide, a scatterer, an emitter, a stepped portion, and a light-shielding member. The stepped portion is formed, from the end surface of the transparent body along the main scan direction, on a side of the light guide that is opposite to the illumination position side of the light guide. The light-shielding member covers a portion of the emitter of the light guide, the portion including the end surface of the transparent body, and extends beyond the stepped portion in the main scan direction and has an end portion that is located out of a scan range of the sensor in the main scan direction.

13 Claims, 12 Drawing Sheets

IMAGE SCANNING DEVICE

CROSS-REFERENCE TO RELATED APPLICATION

This application claims the benefit of Japanese Patent Application No. 2019-085472, filed on Apr. 26, 2019, the entire disclosure of which is incorporated by reference herein.

FIELD

The present disclosure relates to an image scanning device including a light source having a light guide.

BACKGROUND

Some known image scanning devices include a light source (illumination device) that illuminates a linear illumination position of a scan target with light, a lens body that focuses light from the scan target, and a sensor that receives the light focused by the lens body. The image scanning device is used in a facsimile machine, a copier, a scanner, or the like. A light guide is often used in the illumination device that is the light source of the image scanning device.

Some light guides for use in the illumination device have a stepped end portion covered with a metal tube (for example, see Unexamined Japanese Patent Application Kokai Publication No. 2011-253699). Alternatively, some light guides have an end portion tapered and provided with a light-shielding member (for example, see Unexamined Japanese Patent Application Kokai Publication No. 2011-249020).

Such a known illumination device having a structure in which the stepped end portion of the light guide is covered with the metal tube needs installation of the metal tube. This increases the number of components to be installed, thereby posing a challenge of increased complexity. Another known illumination device with the light guide having the end portion tapered and provided with the light-shielding member needs installation of the light-shielding member at the light guide body itself, thereby posing a challenge of increased complexity in a manufacturing process for the light guide.

In view of the above circumstances, an objective of the present disclosure is to provide an image scanning device with a light guide having an end portion with stable optical properties without increased complexity in a manufacturing process.

SUMMARY

An image scanning device according to the present disclosure includes a linear light source, a lens body, and a sensor. The linear light source illuminates a linear illumination position of a scan target with light. The lens body focuses the light from the scan target. The sensor receives the light focused by the lens body. The linear light source includes a light guide, a scatterer, an emitter, a stepped portion, and a light-shielding member. The light guide is a rod-like transparent body extending along a main scan direction of the sensor, and guides, in the main scan direction, light entering the light guide through an end surface of the transparent body. The scatterer is formed along the main scan direction on a surface of the light guide that is opposite to an illumination position side of the light guide, and scatters light. The emitter is formed along the main scan direction on a surface of the light guide between the scatterer and the illumination position and emits the light scattered by the scatterer to the illumination position. The stepped portion is formed, from the end surface of the transparent body along the main scan direction, on a side of the light guide that is opposite to the illumination position side of the light guide. The light-shielding member covers a portion of the emitter of the light guide, the portion including the end surface of the transparent body, and extends beyond the stepped portion in the main scan direction and has an end portion that is located out of a scan range of the sensor in the main scan direction.

According to the present disclosure, arrangement of the light-shielding member can provide the image scanning device for which optical properties at an end portion of the light guide are more stable.

BRIEF DESCRIPTION OF THE DRAWINGS

A more complete understanding of this application can be obtained when the following detailed description is considered in conjunction with the following drawings, in which.

DETAILED DESCRIPTION

Embodiment 1

Figure 1:
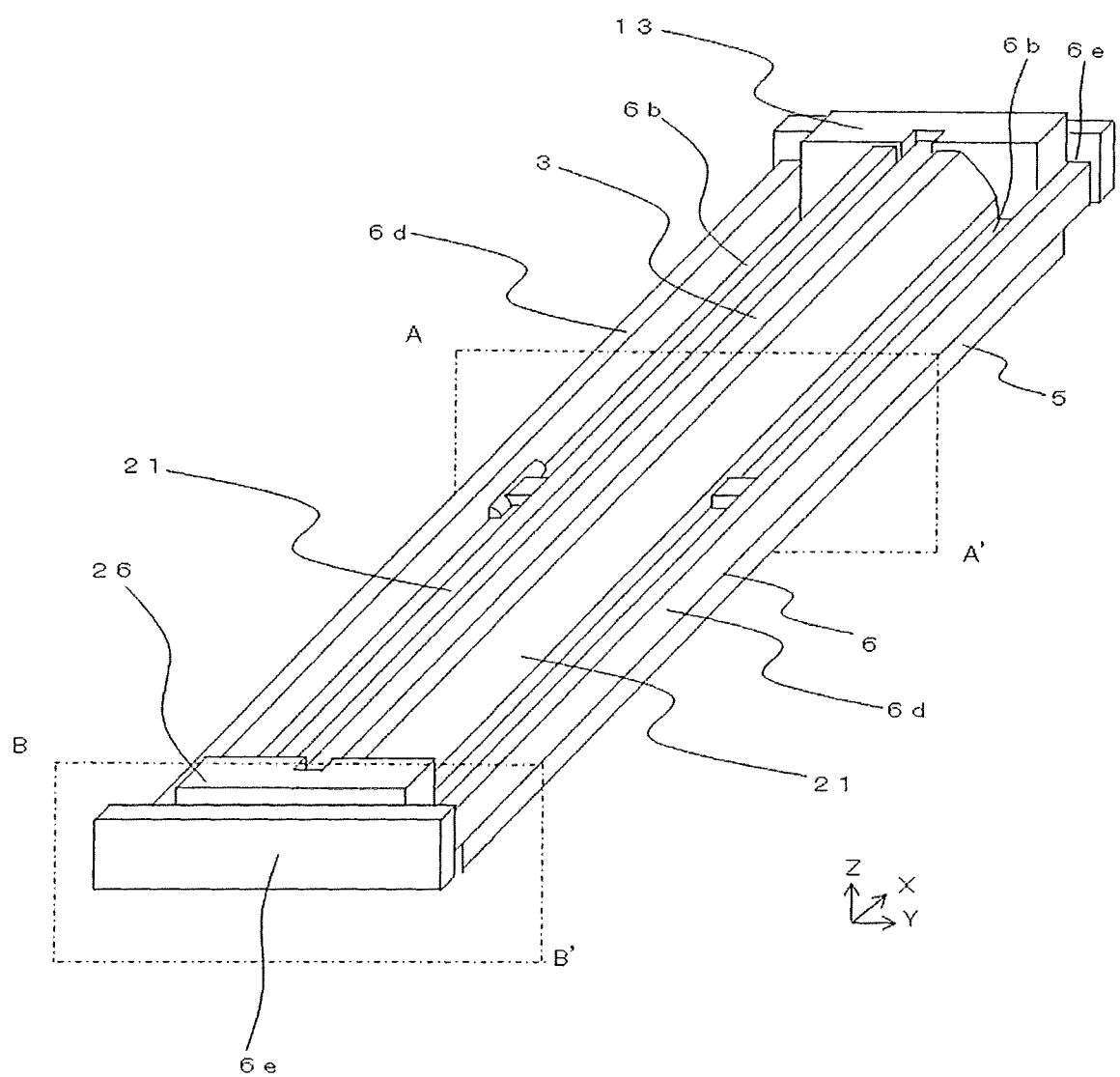
FIG. 1 is a perspective view of an image scanning device according to Embodiments 1 and 3.

An image scanning device according to Embodiment 1 is described below with reference to FIGS. 1 to 9. Throughout the drawings, the same reference signs indicate the same or equivalent portions, and detailed descriptions thereof are omitted. In the drawings, X, Y, and Z indicate coordinate axes. An X-axis direction is referred to as a main scan direction (longitudinal direction), a Y-axis direction is referred to as a sub-scan direction (transverse direction), and a Z-axis direction is referred to as a scan depth direction. The origin of the X-axis is taken to be the middle of a main-scan-direction length of the image scanning device. The origin of the Y-axis is taken to be the middle of a sub-scan direction length of the image scanning device. The origin of the Z-axis is taken to be in a transfer position of a scan target 1 to be scanned by the image scanning device.

In FIGS. 1 to 9, the scan target 1 corresponds to image information of a document, printed matter, paper currency, securities, and other general documents including sheet-like things such as a film. The scan target 1 is a target to be illuminated with light emitted from a linear light source 2 of the image scanning device according to Embodiment 1, and can be termed an illumination target 1. The scan target 1 is a target for scanning of the image information for the image scanning device according to Embodiment 1. The scan target 1 is transferred through a transfer path (transfer space) in a transfer direction, that is, in the Y-axis direction, relative to the image scanning device. The transfer direction can be referred to as a sub-scan direction. The direction crossing the sub-scan direction, preferably perpendicular to the sub-scan direction, is the main scan direction of the image scanning device.

In FIGS. 1 to 9, the linear light source 2 illuminates a linear illumination position on the scan target 1 with light. A lens body 3 focuses light from the scan target 1. An optical-axis direction of the lens body 3, or the Z-axis direction, refers to a direction in which light coming from the scan target 1 first reaches a component (portion) of the lens body 3. As another expression, the optical-axis direction can be a height direction of the image scanning device. As further expression, the optical-axis direction can be the scan depth direction of the image scanning device as described above. The optical-axis direction crosses, preferably is perpendicular to, the main scan direction and sub-scan direction.

Embodiment 1 provides, as an example of the lens body 3, a lens body that focuses reflection light emitted from the linear light source 2 and reflected, specifically, scattered and reflected by the scan target 1, although alternatively, the lens body 3 may focus transmission light emitted from the linear light source 2 and transmitting through the scan target 1. In this case, the scan target 1 or the transfer path is disposed between the linear light source 2 and the lens body 3. The linear light source 2 and the lens body 3 may be included in different housings 6. The housing 6 is described later. Embodiment 1 is also an example in which the lens body 3 is formed of a rod lens array that is an arrangement of multiple rod lenses in the main scan direction, but the lens body 3 is not limited thereto. For example, the lens body 3 may be formed using an optical system of a micro lens array that has the same erect equal magnification as that of a rod lens array, or may be formed using a reducing optical system of lens. The lens body 3 is not limited to the erect equal magnification optical system or the reducing optical system, and the optical path may be bent by arranging a mirror on an optical path of the lens body 3.

In FIGS. 1 to 9, a sensor 4 receives light focused by the lens body 3. When the lens body 3 is a rod lens array or a micro lens array, the sensor 4 is preferably formed of a sensor element array in which sensor elements are arranged in the main scan direction. The sensor 4 has a scan range of preset width, or an effective scan width, in the main scan direction. This scan range is such that, for example when the sensor 4 is the sensor element array, there are cases where the scan range is a distance itself between a sensor element located at one end portion in the main scan direction and a sensor element located at the other end portion in the main scan direction, and where the scan range is a width used for actual scan in the sensor element array. A sensor board 5 is a board on which the sensor 4 is formed. A housing (frame) 6 holds or supports the linear light source 2, the lens body 3, and the sensor board 5.

In FIGS. 1 to 9, the linear light source 2 has at least a light guide 21, a scatterer 22 (light scatterer 22), an emitter 23 (light emitter 23), a stepped portion 24, and a light-shielding member 25. The light guide 21 is a rod-like transparent body extending along the main scan direction of the sensor 4, and guides, in the main scan direction, light entering the light guide 21 through an end surface of the transparent body, that is, through an incident surface. The scatterer 22, which scatters light, is formed along the main scan direction on a surface of the light guide 21 that is opposite to a linear illumination position side of the light guide 21. The emitter 23 is formed along the main scan direction on a surface of the light guide 21 between the scatterer 22 and the illumination position and emits the light scattered by the scatterer 22 to the illumination position. The stepped portion 24 is a cut-out like recess formed, from the end surface of the light guide 21 along the main scan direction, on a side of the light guide 21 that is opposite to the illumination position side of the light guide 21. The light-shielding member 25 covers a portion of the emitter 23 of the light guide 21, the portion including the end surface of the light guide 21, and extends beyond the stepped portion 24 in the main scan direction and has an end portion that is located out of the scan range of the sensor 4 in the main scan direction. When the light guide holder 26 described below is used, the light-shielding member 25 as well as the light guide holder 26 are preferably white resin. In particular, when the light-shielding member 25 is integral with the light guide holder 26, white resin is preferable. Since the light-shielding member 25 also serves as a light blocking wall, the same effect can be obtained even by another member such as a white tape. In this case, the white tape can be attached to the light guide 21 directly. Since use of a member such as a white tape increases the number of components and slightly complicates the structure, the light-shielding member 25 is assumed to be a molded part in Embodiment 1. Thus the light-shielding member 25 is to have a thickness large enough for molding with resin.

Figure 4:
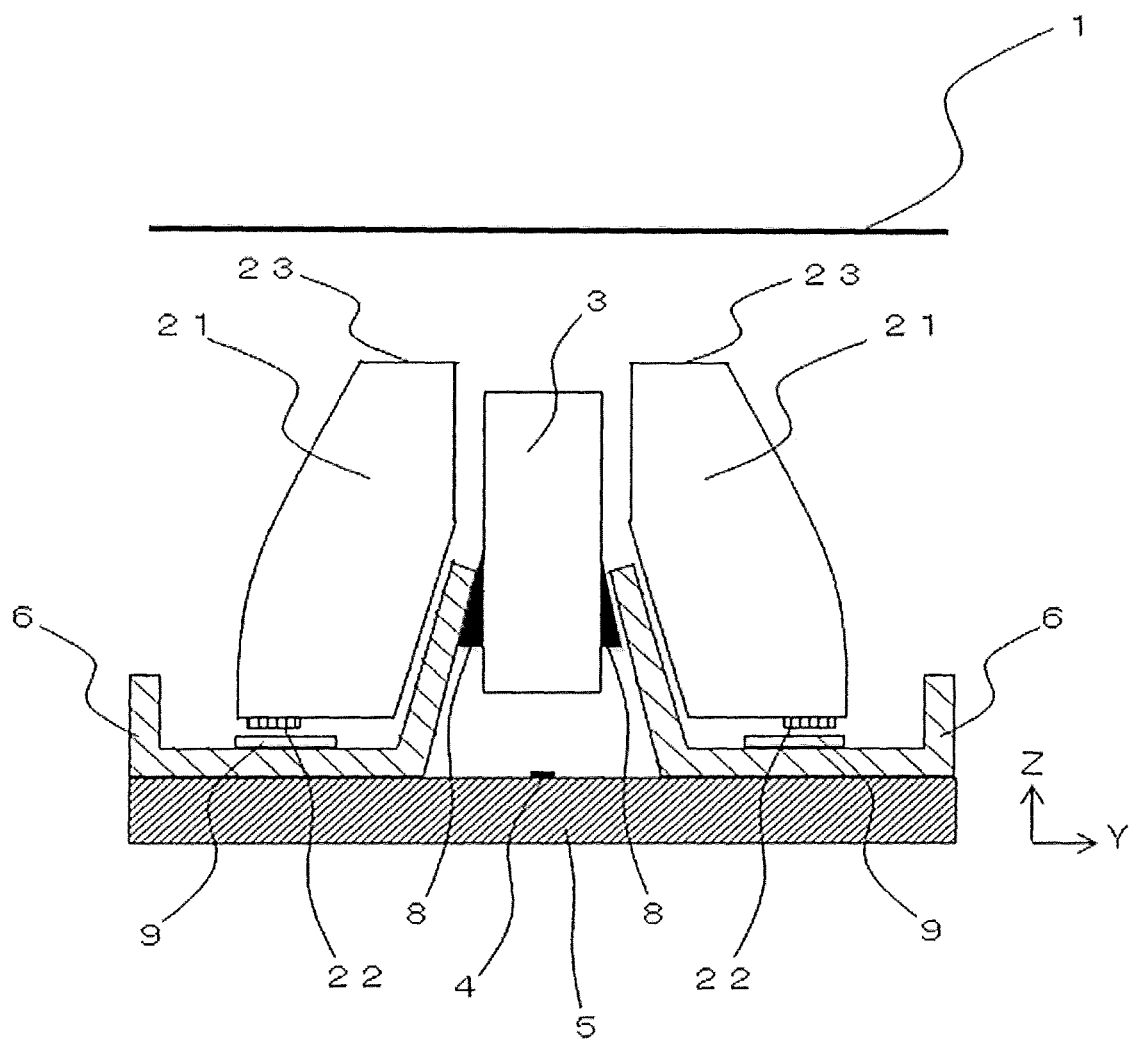
FIG. 4 is a cross-sectional view of the image scanning device according to Embodiment 1.
Figure 5:
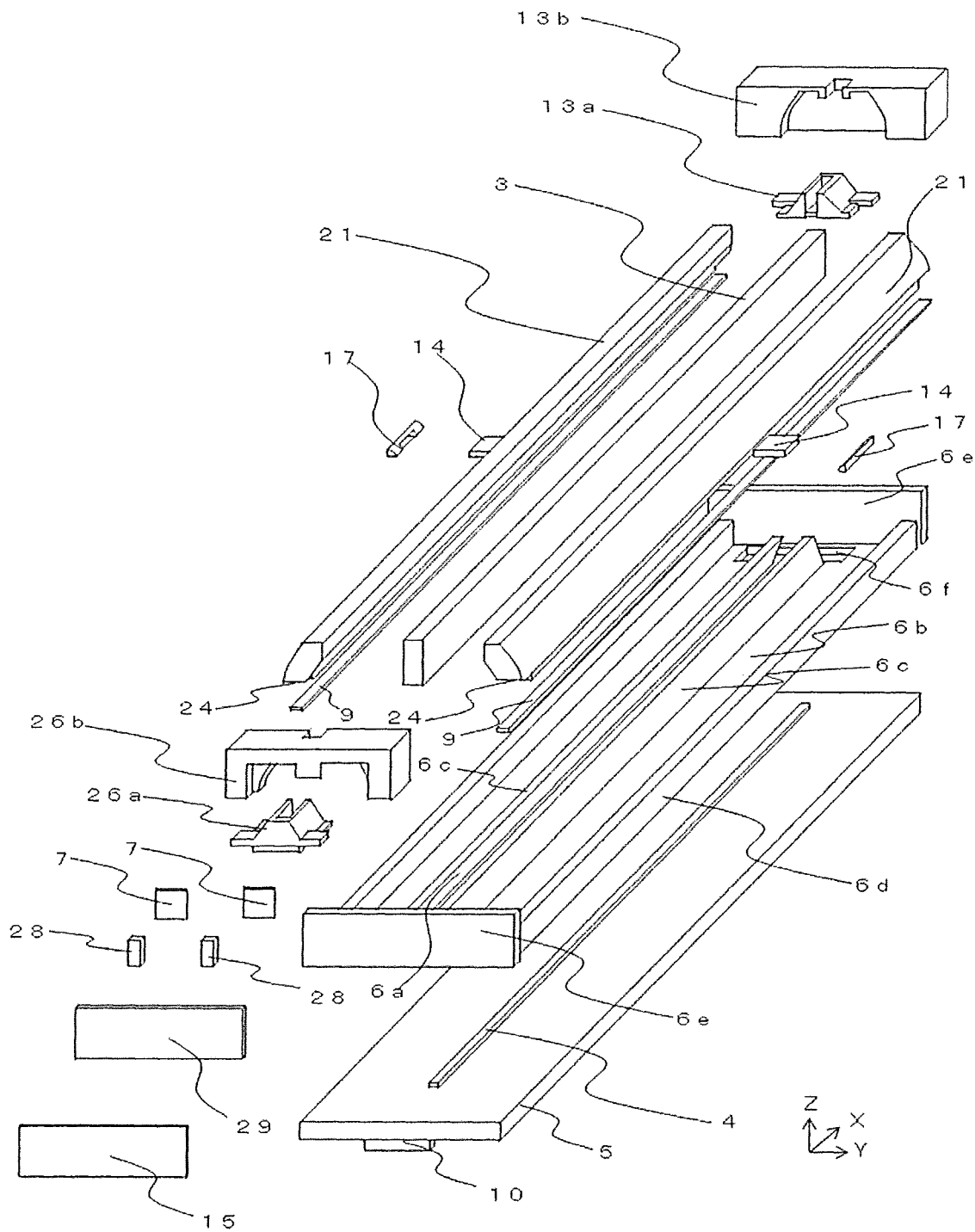
FIG. 5 is an exploded view of the image scanning device according to Embodiments 1 and 3.

Preferably, the linear light source 2 may further include the light guide holder 26 that covers the end surface of the light guide 21 and supports the light guide 21, as illustrated. In FIGS. 1 to 9, the light guide holder 26 has the aforementioned light-shielding member 25. The light guide holder 26 also has a projection 27 corresponding to the stepped portion 24. The projection 27 is a light blocking member and preferably black resin. This is because the projection 27 reflects light leaking from the light guide 21 back to let the light reenter the light guide 21. As illustrated in FIG. 5, the light guide holder 26 preferably has a structure dividable into a portion in which the light-shielding member 25 is formed and a portion in which the projection 27 is formed. A support 26a, which is the portion in which the projection 27 is formed, is covered with a cover 26b, which is the portion in which the light-shielding member 25 is formed. Similarly to the light-shielding member 25, since the projection 27 also serves as a light blocking wall, the same effect can be obtained even by another member such as a black tape. In this case, the black tape can be attached to the light guide 21 directly. Use of a member like a black tape increases the number of components and slightly complicates the structure, and thus the projection 27 is assumed to be a molded part in Embodiment 1. Thus the projection 27 is to have a thickness large enough for molding with resin.

Figure 2:
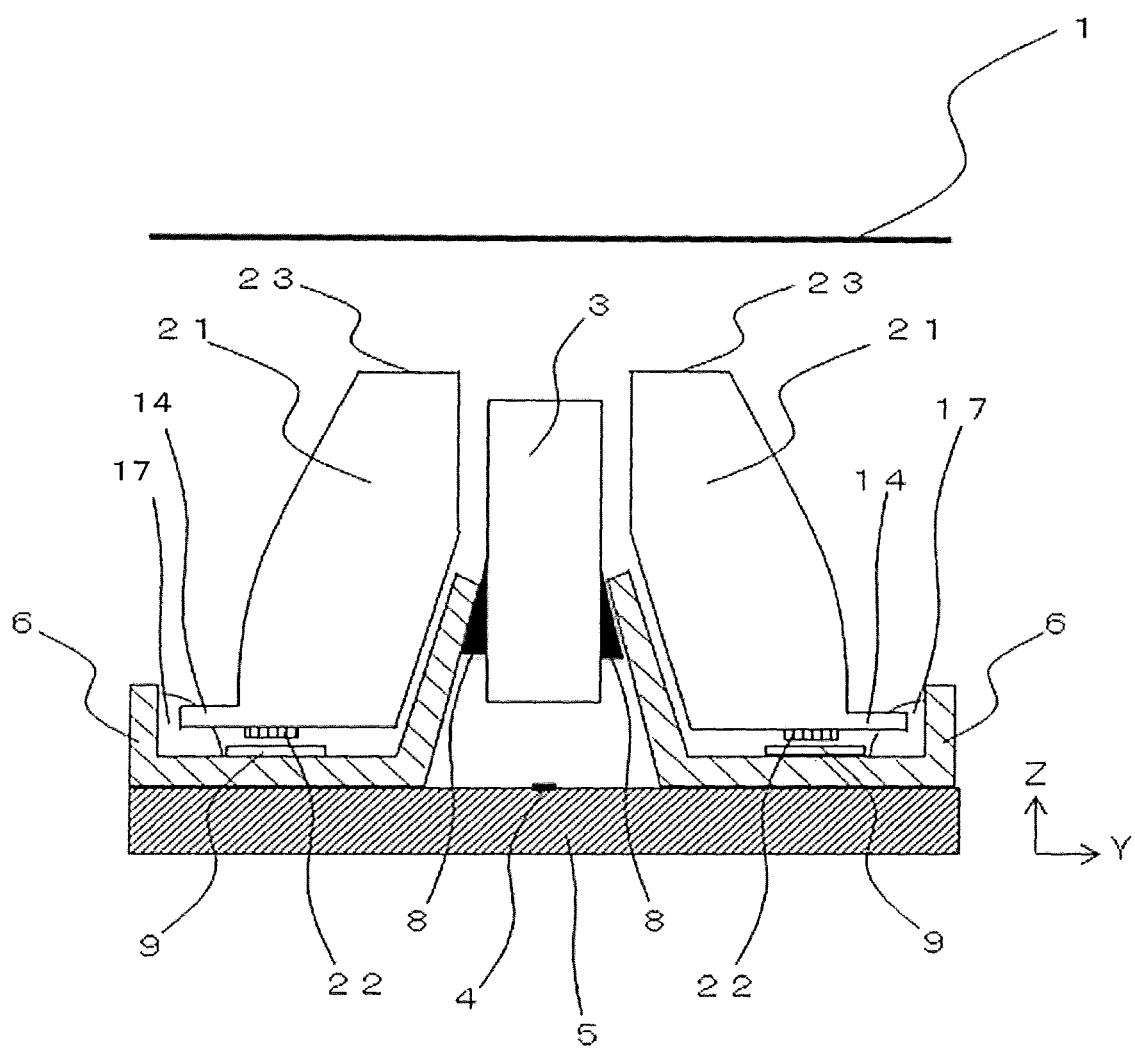
FIG. 2 is a cross-sectional view of the image scanning device according to Embodiment 1.

The image scanning device according to Embodiment 1 is described in further detail. FIG. 1 is a perspective view of an image scanning device according to Embodiment 1. FIG. 2 is a cross-sectional view taken along the line A-A' of FIG.

Figure 3:
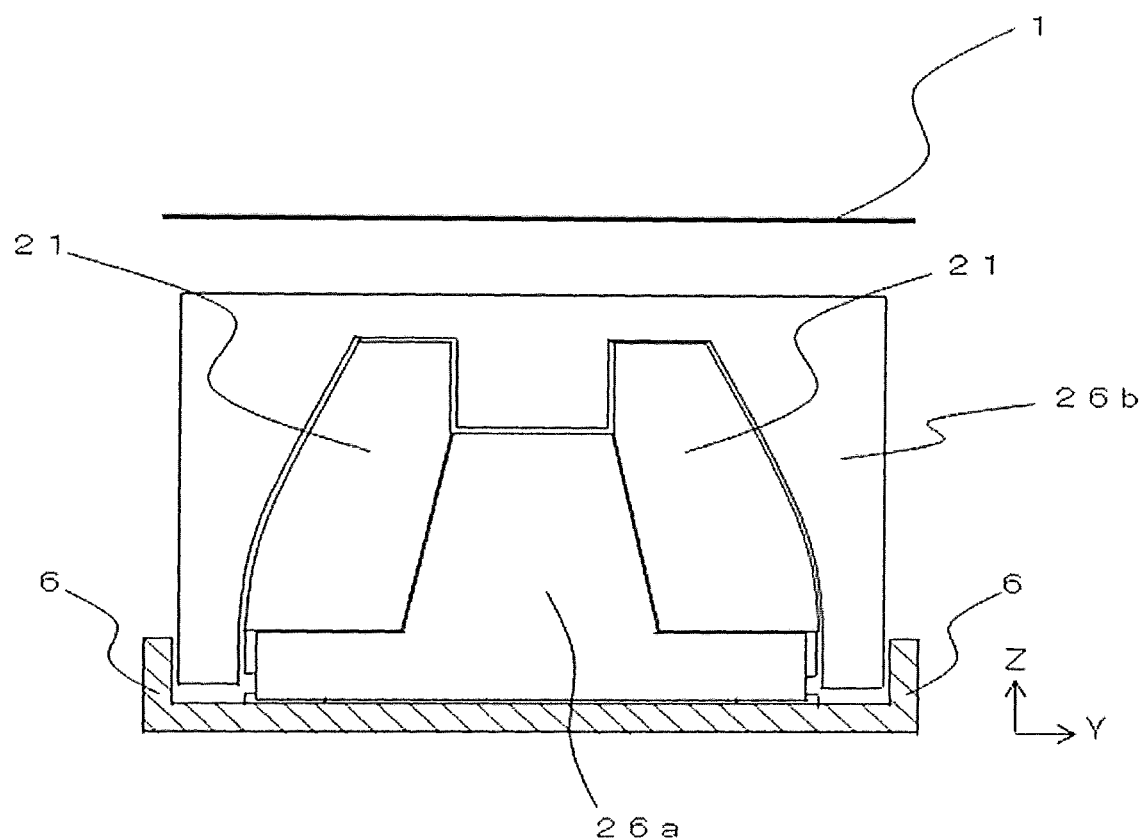
FIG. 3 is a cross-sectional view of the image scanning device according to Embodiment 1.

1, and FIG. 3 is a cross-sectional view taken along the line B-B' of FIG. 1. FIG. 4 is a drawing illustrating another YZ-plane view of the image scanning device other than the views of FIGS. 2 and 3. The YZ plane is a plane including the Y-axis and the Z-axis. FIG. 5 is an exploded view of the image scanning device according to Embodiment 1. Image information of the scan target 1 is read by the image scanning device. The linear light source 2 may further include a light source 28 and a light source board 29. Of course, the linear light source 2 may receive light from an external light source. That is, the light source 28 and the external light source may be any light source that illuminates the end surface of the light guide 21 with light. The light source 28 and the external light source are preferably elements formed on the light source board 29 and external light source boards, for example, light emitting diode (LED), organic electro luminescence (EL), and so on. The light source board 29 may be supported by or fixed on the light guide holder 26 on the side that is opposite to a light guide 21 insertion side of the light guide holder 26. As the light source 28, a light source emitting red light (R), green light (G), blue light (B), white light (H), ultraviolet light (UV), infrared light (IR), or the like is used depending on the image information to be read by scanning.

Throughout the drawings, the light guide 21 is made of, for example, resin or glass, and extends in the X-axis direction. An incident surface is formed at the X-axis-direction end portion of the light guide 21, specifically on the X-axis-direction end side. The light source 28 is disposed facing the incident surface. Light from the light source 28 is directed via a through hole inside the light guide holder 26 toward the incident surface. When light emitted by the light source 28 is from the white light source, infrared light that is unnecessary for image scanning may be emitted. To address this, an infrared cut filter 7 may be disposed between the light source 28 and the incident surface, as illustrated. The infrared cut filter 7 may be supported or fixed on the light guide holder 26. Light of wavelengths transmitted through the infrared cut filter 7 enters the light guide 21 through the incident surface, and is guided through the light guide 21 in the X-axis direction. Thus the light guide 21 can be referred to as a transparent body. Here, the term transparent means a level of transparency in which light from the light source 28 can be guided, and the light here is not limited to visible light. The light guide holder 13 illustrated in FIGS. 1 and 5 is either a holder without a through hole for the light source 28 or a holder where the light source 28 is not disposed, but the basic structure of the light guide holder 13 is the same as that of the light guide holder 26. Details are described in Embodiment 3. In Embodiments 1 and 2, the light guide holder 26 or a holder having another structure may be disposed instead of the light guide holder 13. When the housing 6 also serves as the light guide holder 13, the light guide holder 13 or a holder corresponding to the light guide holder 13 can be omitted.

The example of the light guide 21 illustrated in the drawings has, on one side in the Z-axis direction, a flat surface on which the scatterer 22 extending in the X-axis direction is formed. That is, this flat surface is a segment of a line as viewed in cross section orthogonal to the X-axis. This flat surface can also be described as having the scatterer 22 formed thereon in the X-axis direction. The scatterer 22 has a scattering area having a predetermined length in the Y-axis direction. The light guide 21 includes, on the other side in the Z-axis direction, the emitter 23 extending in the X-axis direction and emitting light externally from the light guide 21. The light guide 21 has a side surface extending in the X-axis direction and connecting between the emitter 23 and the flat surface on which the scatterer 22 is formed. The side surface has a paraboloidal shape that is parabolic in a cross section orthogonal to the X-axis. The side surface is a reflective surface on which light from the scatterer 22 is reflected toward the emitter 23. On the X-axis-direction end of the flat surface on which the scatterer 22 is formed, the stepped portion 24 having a cut-out like shape and extending to the incident surface is disposed, and the light-shielding member 25 that is a light blocking wall of the cover 26b disposed at the X-axis-direction end of the housing 6 is disposed. This light-shielding member 25 blocks light emitted by the light source 28 from being emitted from the emitter 23 after entering a gap between the light guide 21 and the housing 6, reflected on the flat surface of the housing 6, and then entering the light guide 21 from the flat surface on which the scatterer 22 is formed. The light guide 21 may have another shape such as a columnar or prismatic shape.

Since the linear light source 2 has a structure as described above, the linear light source 2 can be referred to as an illumination device. The linear light source 2 may include the light source 28. That is, the illumination device according to Embodiment 1 is an illumination device for an image scanning device, and includes the lens body 3 to focus light from the scan target 1, and the sensor 4 to receive light focused by the lens body 3. The linear light source 2 to illuminate a linear illumination position of the scan target 1 with light is an illumination device that includes the light guide 21, the scatterer 22, the emitter 23, the stepped portion 24, and the light-shielding member 25. The light guide 21 is a rod-like transparent body extending along the main scan direction of the sensor 4 and guides, in the main scan direction, light entering the light guide 21 through the end surface of the transparent body. The scatterer 22 scatters light and is formed along the main scan direction on the surface of the light guide 21 that is opposite to an illumination position side of the light guide 21. The emitter 23 is formed along the main scan direction on the surface of the light guide 21 between the scatterer 22 and the illumination position and emits the light scattered by the scatterer 22 to the illumination position. The stepped portion 24 is formed, from the end surface of the light guide 21 along the main scan direction, on a side of the light guide 21 that is opposite to the illumination position side of the light guide 21. The light-shielding member 25 covers a portion of the emitter 23 of the light guide 21, the portion including the end surface of the light guide 21, and extends beyond the stepped portion 24 in the main scan direction and has an end portion that is located out of the scan range of the sensor 4 in the main scan direction.

In the image scanning device according to Embodiment 1, the lens body 3 is disposed between the scan target 1 and the sensor board 5, and retained on the housing 6 with a retaining member 8 such as a tape or an adhesive. The lens body 3 focuses light emitted by the illumination device and reflected on the scan target 1, and causes the focused light to form an image on the sensor 4. In the drawings, the lens body 3 is illustrated as a rod lens array having an arrayed arrangement as described above. The sensor 4 receives light focused by the lens body 3, and converts the light by photoelectric conversion and outputs the electrical signal. The sensor 4 includes a light receiver 4a having a semiconductor chip and the like, a drive circuit 4b, and the like. The housing 6 disposed between the sensor board 5 and the lens body 3 is formed of resin or sheet metal. The housing 6 has an effect of blocking light entering the sensor 4 from the exterior of the image scanning device, and also a dust proofing effect of preventing ingress of dust or the like into the sensor 4.

The housing 6 includes a pair of flat surface portions 6b, a pair of inclined portions 6c, and side wall portions 6d. The flat surface portions 6b extend in the X-axis direction and are disposed with an opening 6a extending in the X-axis direction between the flat surface portions 6b. The inclined portions 6c stand upward towards the scan target 1 from the end portions of the opening 6a sides of both the flat surface portions 6b in the Y-axis direction. The side wall portions 6d stand upwards toward the scan target 1 from end portions that are opposite to the corresponding opening 6a sides of the flat surface portions 6b in the Y-axis direction. The inclined portions 6c are inclined toward the opening 6a as being located closer to the scan target 1. That is, the inclined portions 6c have a gap therebetween extending in the X-axis direction. The Y-axis-direction spacing of the opening 6a is smaller as the scan target 1 is approached. Holder mounts 6e are provided at both ends of the flat surface portions 6b. The holder mounts 6e have each a bottom surface coplanar with a bottom surface of the corresponding flat surface portion 6b. The lens body 3 is fixed in the opening 6a. The support 26a and the support 13a are disposed or fixed in openings 6f that are formed, one on each of both the X-axis-direction ends in the housing 6, extending in the Y-axis direction. The openings 6f may be non-through holes, and may be recesses.

The flat surface (outer peripheral surface) of the light guide 21 on which the scatterer 22 is formed is disposed facing the flat surface portion 6b of the housing 6. A white tape 9 is disposed between the scatterer 22 and the flat surface portion 6b of the housing 6. The light guide 21 has an effect of causing light transmitted through the scatterer 22 to be reflected on the white tape 9 and return to the light guide 21. This enables effective illumination of the scan target 1 with light. The white tape 9 may be such member that has a high reflectivity. Instead of the white tape 9, a metal tape may be used, or alternatively, the housing 6 may be processed such by painting, vapor deposition, or the like. The light guide 21 is arranged between the inclined portion 6c and the side wall portion 6d. In this arrangement, the side surface (reflective surface) of the light guide 21 is located on the side wall portion 6d side. Two such light guides 21 are disposed symmetrically relative to a plane passing through the lens body 3.

The rod lens array forming the lens body 3 is inserted in the gap of the pair of inclined portions 6c and in the supports 26a and 13a disposed at both the X-axis-direction ends to be located in the opening 6a, and is retained by the supports 26a and 13a, with the rod lens array attached to the pair of inclined portions 6c by the retaining member 8 such as an adhesive or a tape. Both of the X-axis-direction ends of the rod lens array are attached to the supports 26a and 13a disposed in the housing 6 with an adhesive member such as an adhesive or a tape, and are retained by the supports 26a and 13a. The supports 26a and 13a are inserted and positioned in holes in both the X-axis-direction ends of the housing 6, and then are fixed using a tape, an adhesive, screws, or the like.

In addition to the sensor 4 and an external connector 10, other electronic components such as an application specific integrated circuit (ASIC) 11, an analog-to-digital (A/D) conversion circuit 11a, or the like are mounted on the sensor board 5. The external connector 10 is used as an interface for input/output signals including photoelectric conversion outputs of the sensor 4 and signal processing outputs of such conversion outputs. The ASIC 11 can be described as a signal processing IC that operates together with a central processing unit (CPU) 12a and a random access memory (RAM) 12b to process signals such as photoelectric conversion outputs received from the sensor 4. The CPU 12a, the RAM 12b, and a signal processing circuit 12c of the ASIC 11 may be collectively referred to as a signal processor 12. The sensor board 5 is fixed to the housing 6 using a tape, an adhesive, a screw, or the like. The sensor board 5 is fixed to the side of the flat surface portion 6b that is opposite to the flat surface portion 6b of the housing 6 on which the light guide 21 is disposed. In this arrangement, the optical-axis of the lens body 3 passes through the sensor 4 on the sensor board 5.

The light guide holder 26 is disposed on one end portion of the light guide 21 in the X-axis direction. The light guide 21 is fixed by sandwiching the light guide 21 between the support 26a and the cover 26b disposed at the end portion of the housing 6. Thus the end portion of the light guide 21 may be described as being inserted into one of the through holes of the light guide holder 26. The light guide holder 26 with the light guide 21 inserted therein is fixed to the holder mount 6e of the housing 6 using a tape, an adhesive, a screw, or the like. The light guide holder 26 is formed of white resin or the like, as described above. In this arrangement, the light guide 21 is disposed such that the flat surface of the light guide 21 on which the scatterer 22 is formed faces the flat surface portion 6b of the housing 6.

The light guide holder 13 is disposed on the other end portion of the light guide 21 in the X-axis direction. This means that the light guide holder 13 is disposed at the end portion of the light guide 21 that is opposite to the end portion thereof at which the light guide holder 26 is disposed. The light guide 21 is fixed by inserting the end portion of the light guide 21 into a hole of the light guide holder 13 and sandwiching the light guide 21 between the support 13a and the cover 13b that are disposed at the end portion of the housing 6. The light guide holder 13 with the light guide 21 inserted therein is fixed to the holder mount 6e of the housing 6 using a tape, an adhesive, a screw, or the like. The holder mount 6e on which the light guide holder 13 is fixed is located, relative to the light guide 21 in the X-axis direction, on the opposite side of the holder mount 6e on which the light guide holder 26 is fixed. The light guide holder 13 is formed of white resin or the like. In this arrangement, the light guide 21 is disposed such that the flat surface of the light guide 21 on which the scatterer 22 is formed faces the flat surface portion 6b of the housing 6. The light guide holder 13 can also be described as a light guide holder 13 without a light source.

The light guide 21 has, at a position near the middle of the light guide 21 in the X-axis direction, a fastening projection 14 extending in the Y-axis direction. The fastening projection 14 is for fixing the light guide 21 to the housing 6 using an adhesive 17. Both the X-axis-direction ends of the light guide 21 are positioned by the light guide holders 26 and 13, while there is no member to restrain the position of the light guide 21 for the middle portion of the light guide 21 in the X-axis direction. Thus the light guide 21 is fixed at a designed position by attaching the fastening projection 14 to the housing 6 while measuring the position of the light guide 21. In Embodiment 1, although a single fastening projection 14 is provided for a single light guide 21, multiple fastening projections 14 may be provided.

The light source board 29 is a board on which the light source 28 is mounted. The light source board 29 is disposed on the side of the light guide holder 26 that is opposite to the light guide 21 insertion side of the light guide holder 26. In this arrangement, the light source 28 is disposed at a position corresponding to the through hole of the light guide holder 26, and faces the incident surface of the light guide 21. In Embodiment 1, the light source 28 is disposed at one end of the light guide 21. An adhesive heat dissipation sheet 15 is disposed on the side of the light source board 29 that is opposite to the light source 28 mounting side of the light source board 29. The light source board 29 is thereby fixed to the housing 6 by the heat dissipation sheet 15. In this case, heat generated when the light source 28 is turned on is conducted via the heat dissipation sheet 15 toward the metallic housing 6 and is then dissipated.

Figure 6:
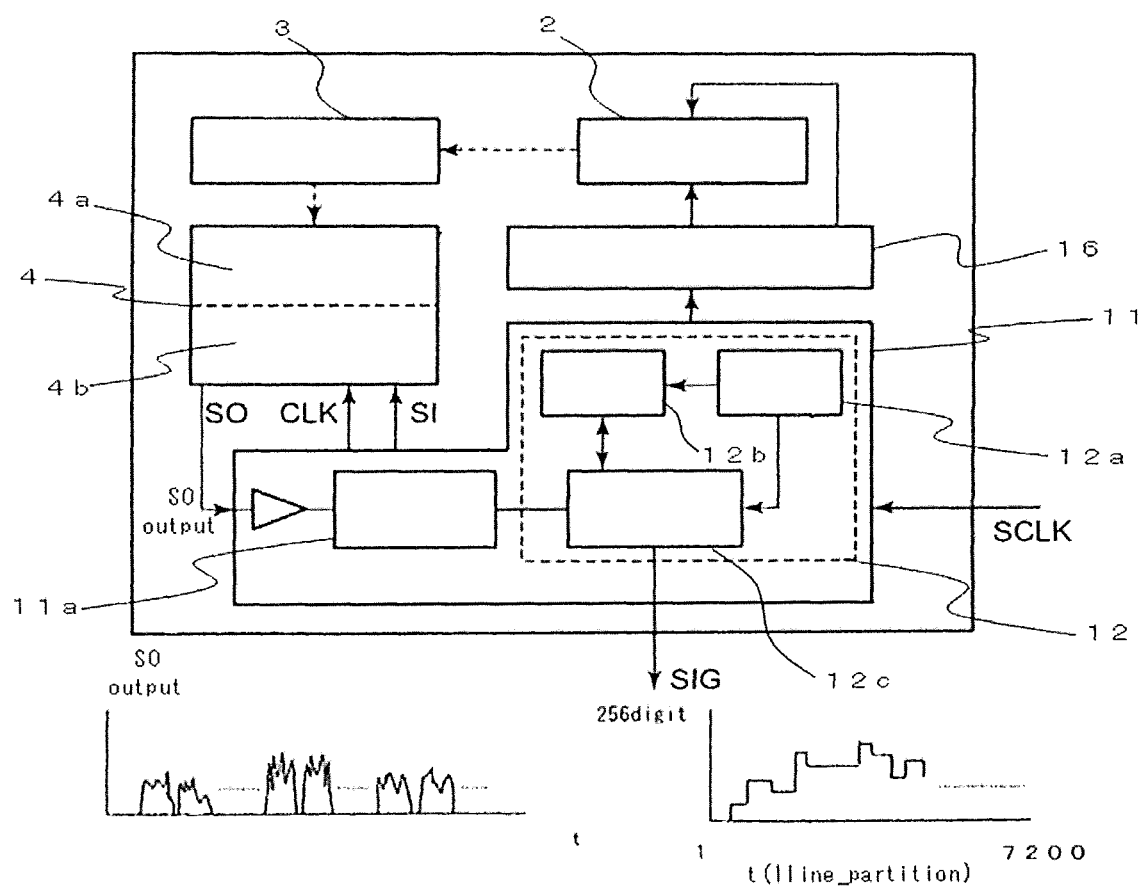
FIG. 6 is a circuit diagram of the image scanning device according to Embodiment 1.

Operations of the image scanning device according to Embodiment 1 are described below. FIG. 6 is a circuit diagram of the image scanning device according to Embodiment 1. First of all, the ASIC 11 sends light source turn-on signals to a light source drive circuit 16. The light source drive circuit 16 supplies power to each light source 28 for a predetermined time based on the received light source turn-on signals. Each light source 28 emits light during the supplying of power. Light emitted by the light source 28 enters the light guide 21 through the incident surface of the light guide 21, propagates (is guided) while repeatedly undergoing transmission or reflection, and reaches the scatterer 22 of the light guide 21. Some of light entering the scatterer 22 is reflected in the Z-axis direction, is emitted from the emitter 23 of the light guide 21, and is directed toward the scan target 1. The light directed toward the scan target 1 is reflected by the scan target 1 and focused by the lens body 3 to form an image on the sensor 4.

Figure 7:
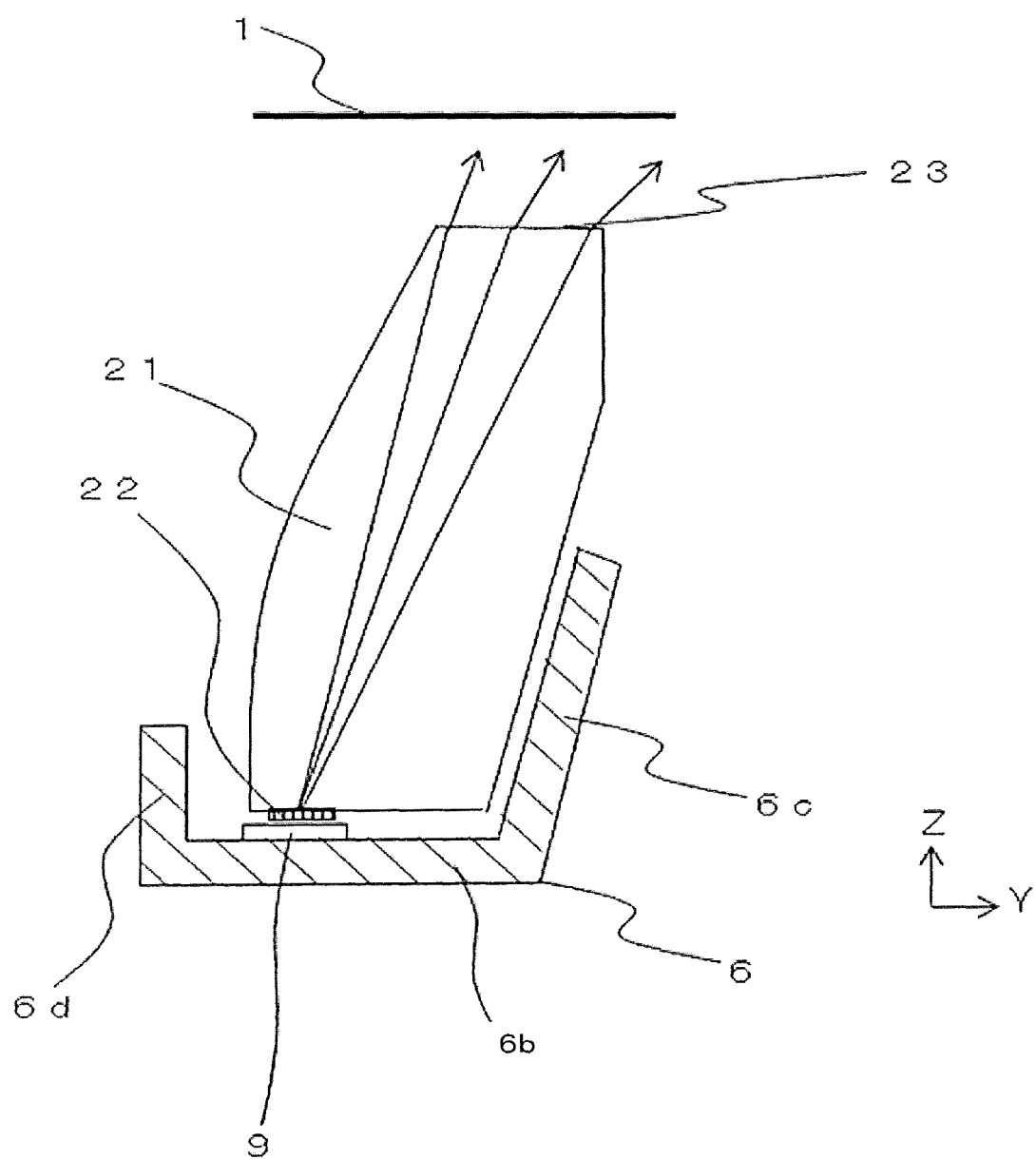
FIG. 7 is a drawing indicating illumination paths of the image scanning device according to Embodiment 1.
Figure 8:
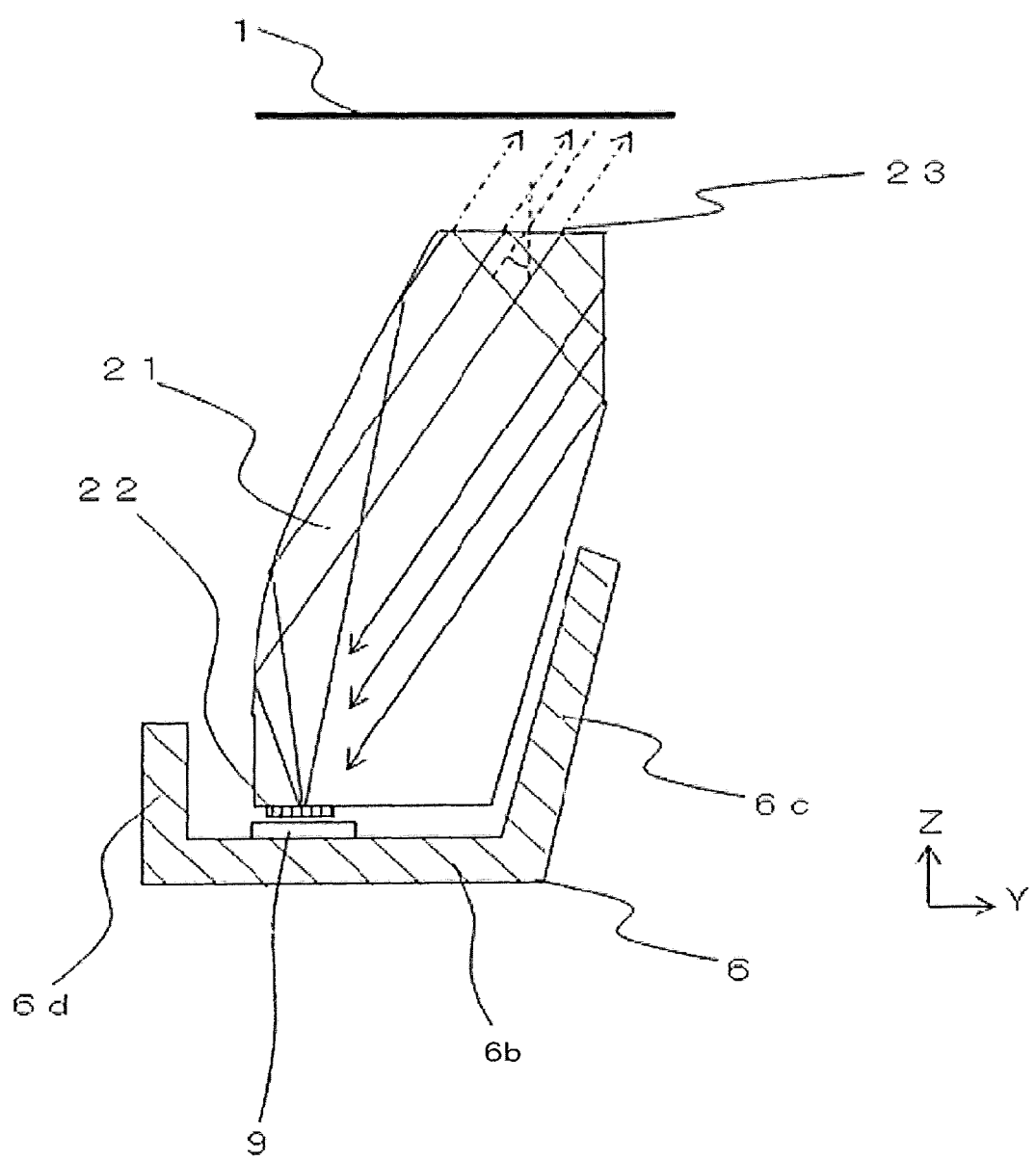
FIG. 8 is a drawing illustrating illumination paths of the image scanning device according to Embodiment 1.

Here, the light guide 21 is described in detail. FIGS. 7 and 8 are drawings indicating illumination paths of the image scanning device according to Embodiment 1. FIGS. 7 and 8 are also cross-sectional views of the transparent body in the YZ plane. In FIG. 7, arrows indicate rays and directions of light. The light guide 21 includes the scatterer 22 on the flat surface on the housing 6 side of the light guide 21. The flat surface on which the scatterer 22 is formed extends in the X-axis direction, and the scatterer 22 is also formed in the X-axis direction. The scatterer 22 has a scattering area having a predetermined length in the Y-axis direction.

The scatterer 22 is formed in the light guide 21, specifically by an uneven fine surface or embossed surface, or by processing such as silk screening. The scatterer 22 changes the propagation direction of light by reflecting or refracting light propagating in the light guide 21 in the X-axis direction, and allows irradiation of the scan target 1 with light. With this arrangement, the scatterer 22 serves as a second light source. Thus even if color of light or an amount of light emission of the light source 28 changes due to its long-term deterioration, such changes can occur in the X-axis direction entirely in a similar manner. Thus unlike the image scanning device including an array light source, the long-term deterioration of the light source 28 is unlikely to change brightness or color only in a particular area. Light present in the scatterer 22 is reflected light as well as light that is transmitted through the light guide 21. For this reason, the white tape 9 provided on the flat surface portion 6b of the housing 6 under the scatterer 22 is preferably a material having a high reflectivity. Providing the white tape 9 made of a high reflectivity material allows the light having transmitted through the scatterer 22 to be returned into the light guide 21, which enables efficient irradiation of the scan target 1.

The light guide 21 includes the emitter 23 having a flat surface shape, and the emitter 23 is located on the side of the light guide 21 that is opposite to the flat surface on which the scatterer 22 is formed. The emitter 23 extends in the X-axis direction. The light guide 21 includes, between the emitter 23 and the flat surface on which the scatterer 22 is formed, a side surface connecting the emitter 23 and the flat surface on which the scatterer 22 is formed. The side surface extends in the X-axis direction and is a reflective surface that has a parabolic shape in the YZ plane. The scatterer 22 is formed, in the YZ plane, at a focal point of the reflective surface.

Light entering the light guide 21 through the incident surface propagates in the transparent body and is reflected by the scatterer 22. Among the light reflected by the scatterer 22, light reflected toward the emitter 23 is emitted from the emitter 23 and directed onto the scan target 1, as illustrated in FIG. 7. Some light rays are further reflected on the reflective surface as illustrated in FIG. 8, and are directed to the emitter 23. Since the scatterer 22 is located at the focal point of the reflective surface, the light reflected by the reflective surface is directed toward the emitter 23 as collimated light.

The emitter 23 is a flat surface and a normal direction of the flat surface of the emitter 23 is set to a direction in which the collimated light reflected on the reflective surface is totally reflected by the emitter 23. Thus by such configuration, the collimated light directed toward the emitter 23 is reflected by the emitter 23 and directed onto the scatterer 22 again while propagating in the light guide 21. Thus the light entering the scatterer 22 is scattered and reflected, which enables uniformity in the effect on an illuminance distribution of the light emitting surface of the light source 28.

Figure 9:
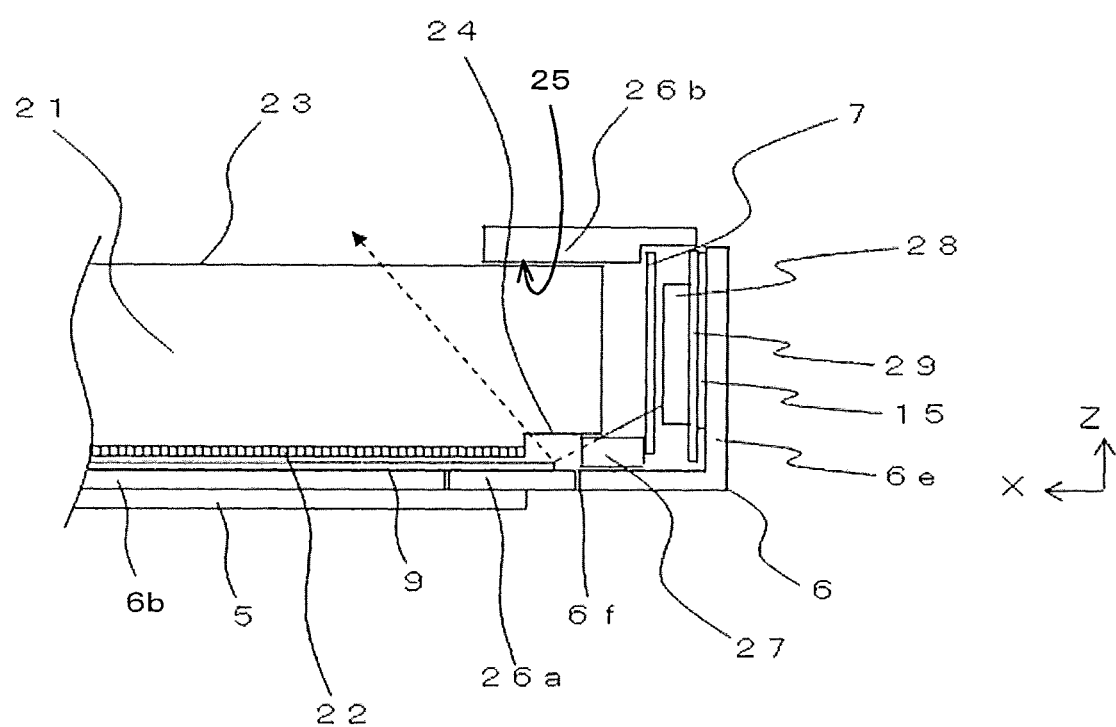
FIG. 9 is a partial cross-sectional view of a light guide of the image scanning device according to Embodiment 1.

FIG. 9 is a partial cross-sectional view of a portion around the end portion of the light guide 21 in the main scan direction. Specifically, FIG. 9 is a partial cross-sectional view in an XZ plane passing through the scatterer 22. The XZ plane is a plane including the X-axis and the Z-axis. As illustrated in FIG. 9, in Embodiment 1, the linear light source 2, which is an illumination device, includes the light guide 21, the scatterer 22, the emitter 23, the stepped portion 24, and the light-shielding member 25. The stepped portion 24 is parallel to the main scan direction and is formed, from the end surface of the light guide 21 along the main scan direction, on a side of the light guide 21 that is opposite to the illumination position side of the light guide 21. For example, the stepped portion 24 has a shape obtained by cutting out the light guide 21 at a right angle. Specifically, the stepped portion 24 preferably has a surface parallel to the flat surface portion 6b and a surface orthogonal to both of the flat surface portion 6b and a plane parallel to the flat surface portion 6b. In addition, the linear light source 2 may further include the light guide holder 26 that covers the end surface of the light guide 21 and supports the light guide 21. The light guide holder 26 may form the light-shielding member 25. The light guide holder 26 may form the projection 27 corresponding to the stepped portion 24. The projection 27 may be shaped to be parallel to the main scan direction so as to conform to the shape of the stepped portion 24.

Providing the projection 27 enables blockage of the light entering a gap between the light guide 21 and the housing 6 and reflected on the flat surface portion 6b of the housing 6, which enables illumination having a uniform optical properties over the entire area in the main scan direction. As illustrated, the support 26a and the projection 27 may be separate components. As illustrated, the white tape 9 may extend to the support 26a. Of course, the white tape 9 attached to the support 26a and the white tape 9 attached to the flat surface portion 6b of the housing 6 may be separate components. At least a portion of the support 26a corresponding to the white tape 9 may be made of white resin.

Embodiment 2

Figure 10:
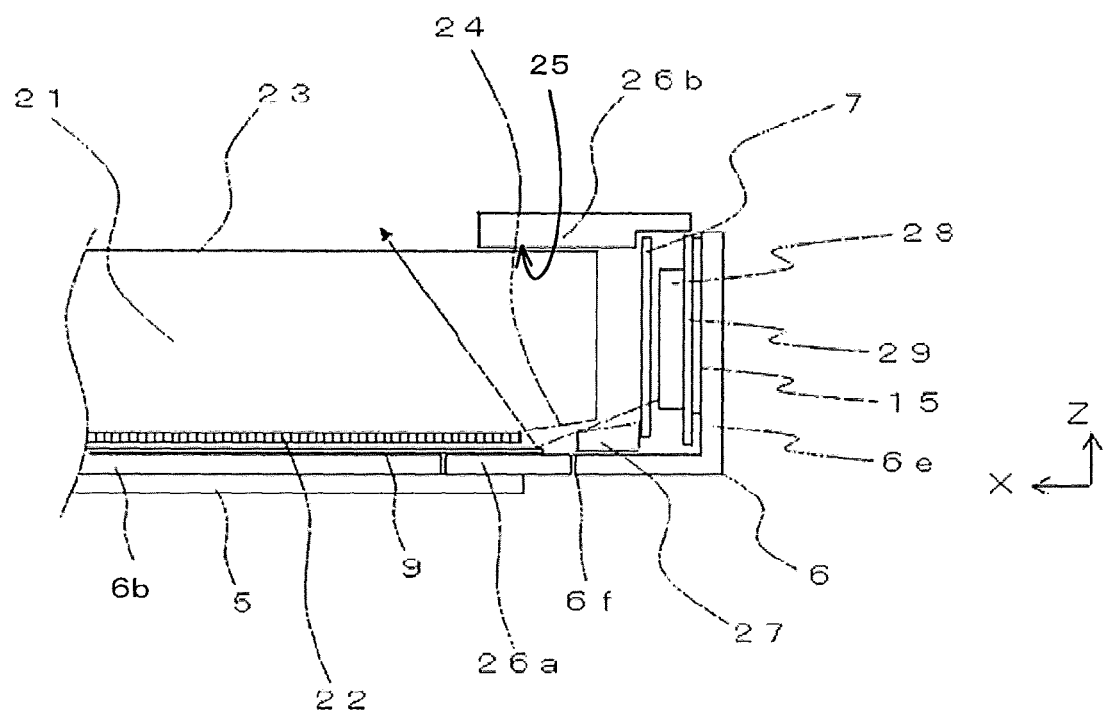
FIG. 10 is a partial cross-sectional view of a light guide of the image scanning device according to Embodiment 2.
Figure 11:
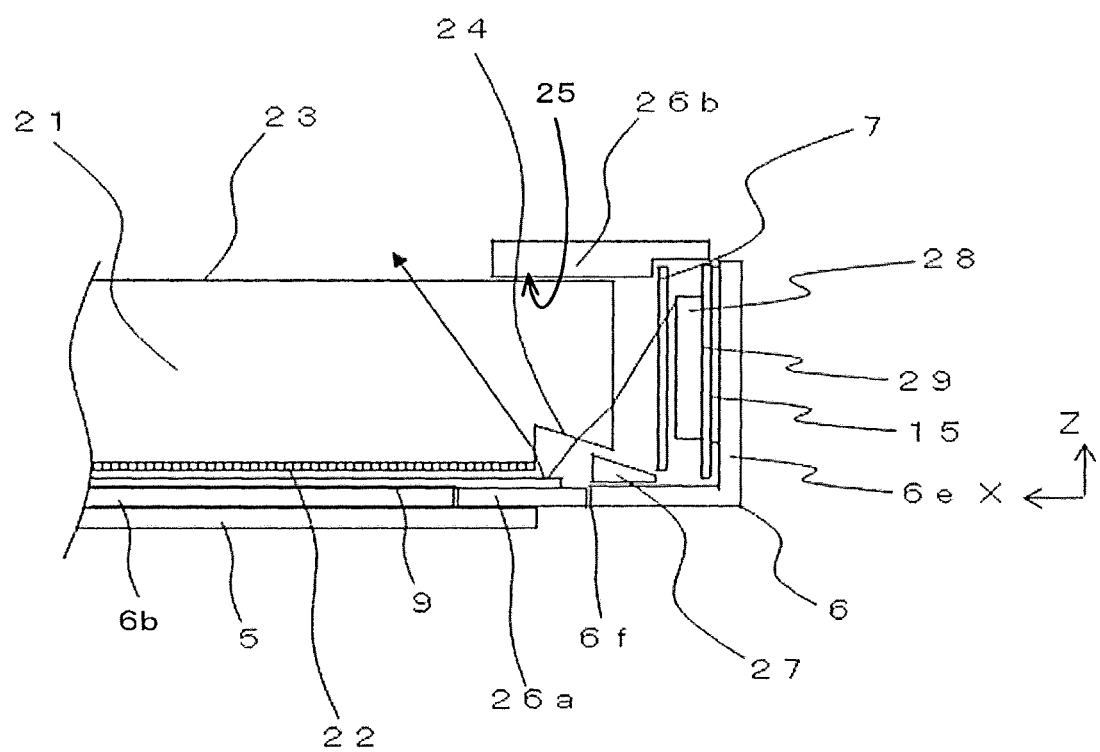
FIG. 11 is a partial cross-sectional view of the light guide of the image scanning device according to Embodiment 2.

An image scanning device according to Embodiment 2 is described using FIGS. 10 and 11. FIGS. 10 and 11 are each a partial cross-sectional view of a portion around the end portion of the light guide 21 in the main scan direction. Specifically, FIGS. 10 and 11 are partial cross-sectional views in the XZ plane passing through the scatterer 22. Throughout the drawings, the same reference signs indicate the same or equivalent portions, and the detailed descriptions thereof are omitted. In FIGS. 10 and 11, the stepped portion 24, although described later in detail, preferably has an angle of inclination relative to the main scan direction of 7° or less. Making the projection 27 and the stepped portion 24 have a complementary shape is desirable. In other words, the projection 27 preferably has an angle of inclination relative to the main scan direction of 7° or less.

In the image scanning device according to Embodiment 1 illustrated in FIG. 9, optical properties of the X-axis-direction end portion on the light source 28 side tend to deteriorate because a light amount distribution of the light emitting surface of the light source 28 is transferred as collimated light onto the scan target 1 when the light entering the light guide 21 from the light source 28 through the incident surface, directed onto the scatterer 22 directly, and reflected by the scatterer 22 (referred to hereinafter as direct reflection light) reaches the scan target 1.

In such a case, a normal line of the flat surface on which the scatterer 22 is formed and a normal line of the emitter 23 are set such that direct incident light is totally reflected by the emitter 23, thereby preventing the direct reflection light from reaching the scan target 1. The light totally reflected by the emitter 23, while propagating through the light guide 21, again is incident upon and reflected by the scatterer 22. In this scattering and reflection, since the light amount distribution of the light emitting surface of the light source 28 is made uniform, the optical properties of the end portion on the light source 28 side are stable. Thus an angle Φ between the normal line of the flat surface on which the scatterer 22 is formed and the normal line of the emitter 23 is preferably an angle at which the direct reflection light is totally reflected by the emitter 23. This angle is 40° or more when the light guide 21 is transparent resin.

Light directed from the emitter 23 of the light guide 21 onto the scan target 1 does not include the direct reflection light that may cause deterioration of optical properties of the end portion. This achieves uniform and stable optical properties over the light guide 21 in the main scan direction. The direct reflection light rays capable of being blocked with this method are only of light directly incident upon the scatterer 22 through the incident surface and reflected by the scatterer 22. Light rays that may cause deterioration of optical properties of the end portion include the following light: the light emitted by the light source 28 illustrated in FIG. 9 enters the gap between the light guide 21 and the housing 6 and is reflected on the flat surface portion 6b of the housing 6, and enters the light guide 21 through the flat surface on which the scatterer 22 is formed and is emitted from the emitter 23. Although such light following this path cannot be blocked by the light guide 21 having the shape according to Embodiment 1, the light can be blocked by providing the projection 27 protruding from the support 26a.

In the image scanning device according to Embodiment 2, as illustrated in FIGS. 10 and 11, the linear light source 2, which is an illumination device according to Embodiment 2, includes the light guide 21, the scatterer 22, the emitter 23, the stepped portion 24, and the light-shielding member 25. The stepped portion 24 is inclined relative to the main scan direction and is formed, from the end surface of the light guide 21 along the main scan direction, on a side of the light guide 21 that is opposite to the illumination position side of the light guide 21. For example, the stepped portion 24 has a surface inclined relative to the horizontal plane. In addition, the linear light source 2 may further include the light guide holder 26 that covers the end surface of the light guide 21 and supports the light guide 21. The light guide holder 26 may form the light-shielding member 25. The light guide holder 26 may form the projection 27 corresponding to the stepped portion 24. The projection 27 may be shaped to be inclined to the main scan direction so as to conform to the shape of the stepped portion 24, as illustrated.

Specifically, the thickness for the projection 27 that is a light blocking wall is ensured by providing the stepped portion 24 on the flat surface, on which the scatterer 22 is formed, at the end of the light guide 21 in the main scan direction. In Embodiment 1, the cut-out like stepped portion 24 is made to have a right angle, but in Embodiment 2, the cut-out like stepped portion 24 is made to be angled. To prevent interference of the light guide 21 with the projection 27 occurring due to expansion of the light guide 21, a gap is to be provided between the stepped portion 24 and the projection 27 (FIGS. 10 and 11). The stepped portion 24 illustrated in FIG. 10 has a surface inclined relative to the flat surface portion 6b. Specifically, a distance between the flat surface portion 6b and the surface inclined relative to the flat surface portion 6b is smaller with increased distance from the end surface of the light guide 21. In other words, the Z-axis-direction length of the portion of the light guide 21 having the stepped portion 24 is greater with increased distance from the end surface of the light guide 21. The stepped portion 24 illustrated in FIG. 11 has a surface inclined relative to the flat surface portion 6b. Specifically, a distance between the flat surface portion 6b and the surface inclined relative to the flat surface portion 6b is greater with increased distance from the end surface of the light guide 21. In other words, the Z-axis-direction length of the portion of the light guide 21 having the stepped portion 24 is smaller with increased distance from the end surface of the light guide 21. The stepped portion 24 illustrated in FIG. 9 has a surface parallel to the flat surface portion 6b. Specifically, the Z-axis-direction length of the portion of the light guide 21 having the stepped portion 24 illustrated in FIG. 9 does not change even with increased distance from the end surface of the light guide 21.

In Embodiment 2, the stepped portion 24 is inclined relative to the main scan direction. This inclination may fail to prevent blockage of light that may cause deterioration of optical properties of the end portion of the light guide 21 of FIG. 10 because light is directed onto the white tape 9 from a gap between the projection 27 and the light guide 21 that is provided to accommodate to expansion of the light guide 21. This inclination may also cause of deterioration of optical properties of the end portion of the light guide 21 with the stepped portion 24, as illustrated in FIG. 11, having a reversely-oriented inclination compared with that of FIG. 10 because light passing through the incident surface may leak through the inclined stepped portion 24 and be reflected on the white tape 9 toward the scan target 1. Thus the stepped portion 24 preferably has a shape obtained by cutting out the light guide 21 at a right angle as illustrated in FIG. 9. If the stepped portion 24 is designed to be inclined for some manufacturing purposes, an angle between the flat surface portion 6b and the surface inclined relative to the flat surface portion 6b is preferably set to 7° or less at which light passing through the incident surface can be totally reflected by the side surface of the light guide 21.

Embodiment 3

Figure 12:
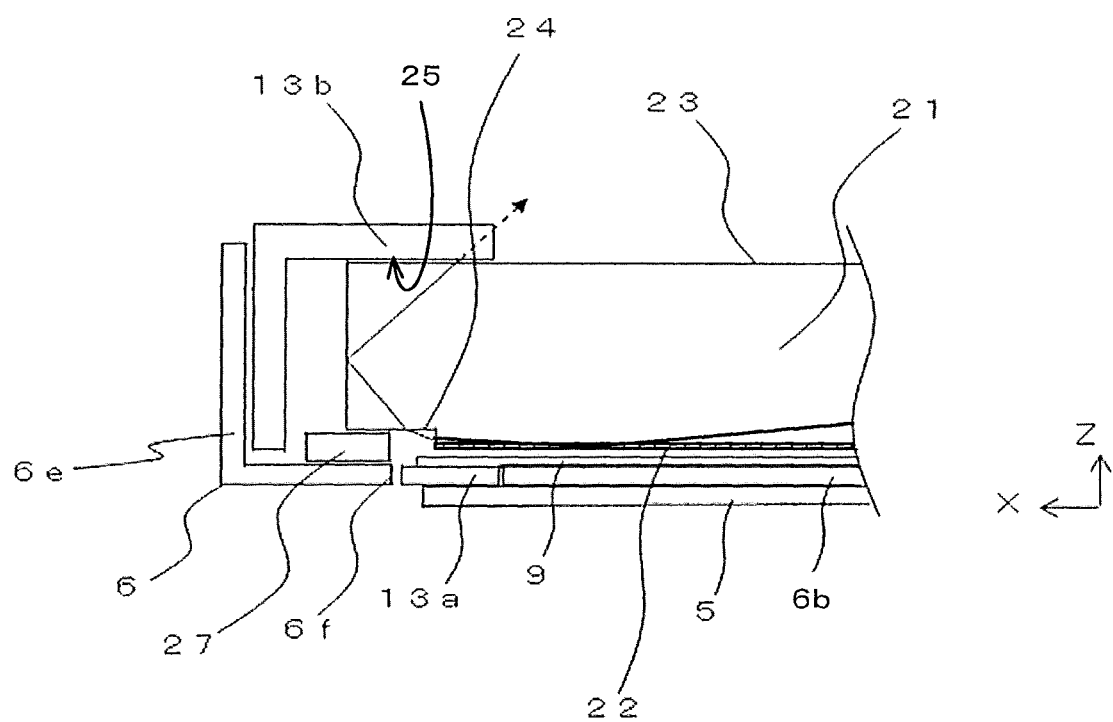
FIG. 12 is a partial cross-sectional view of a light guide of the image scanning device according to Embodiment 3.

An image scanning device according to Embodiment 3 is described below with reference to FIGS. 1, 5, and 12. FIG. 12 is a partial cross-sectional view of a portion around the end portion of the light guide 21 in the main scan direction. Specifically, FIG. 12 is a partial cross-sectional view in the XZ plane passing through the scatterer 22. FIGS. 9 to 11 are each a partial cross-sectional view illustrating a portion around one end portion of the light guide 21, but FIG. 12 is a partial cross-sectional view illustrating a portion around the other end portion of the light guide 21. Throughout the drawings, the same reference signs indicate the same or equivalent portions, and the detailed descriptions thereof are omitted. In the aforementioned Embodiments 1 and 2, the light-shielding member 25 is disposed on the light source 28 side, but in Embodiment 3 described below, the light-shielding member 25 and the projection 27 are formed on the light guide holder 13. In this case, the stepped portion 24 is also formed at a portion of the light guide 21 that is inserted into the light guide holder 13.

In FIG. 12, the light guide holder 13 has a light-shielding member 25 similarly to that of the light guide holder 26. The light guide holder 13 has the projection 27 corresponding to the stepped portion 24. As illustrated in FIG. 5, the light guide holder 13 preferably has a structure dividable into a portion in which the light-shielding member 25 is formed and a portion in which the projection 27 is formed. In addition to the stepped portion 24 described in Embodiment 1 or 2, the stepped portion 24 is formed on a side of the light guide 21 that is opposite to the illumination position side of the light guide 21, from the end surface that is opposite to the end surface of the light guide 21 through which the light enters, along the main scan direction. In addition to the light-shielding member 25 described in Embodiment 1 or 2, the light-shielding member 25 covers a portion of the emitter 23 of the light guide 21, the portion including the end surface of the light guide 21 that is opposite to the end surface of the light guide 21 through which the light enters, and extends beyond the stepped portion 24 in the main scan direction and has an end portion that is located out of a scan range of the sensor 4 in the main scan direction.

As illustrated in FIGS. 5 and 12, the light guide holder 13, similarly to the light guide holder 26, preferably has a structure dividable into a portion in which the light-shielding member 25 is formed and a portion in which the projection 27 is formed, as described above. A support 13a, which is the portion in which the projection 27 is formed, is covered with a cover 13b in which the light-shielding member 25 is formed. The light guide holder 13, the support 13a, and the cover 13b are also illustrated in FIG. 1.

FIG. 12 illustrates the other end of the light guide 21 according to Embodiment 3, in other words, the end portion of the light guide 21 that is on the side farther from the light source 28. FIG. 12 is a cross-sectional view that is located nearer the lens body 3 than those of FIGS. 9 and 11. In the light guide 21 of FIG. 12, after light propagating in the light guide 21 leaks from the stepped portion 24 of the light guide 21 and enters the light guide 21 again, the light may be totally reflected on the surface facing the incident surface and then reach the scan target 1. Since an emission angle of this light differs from that of the light reflected by the scatterer 22 and directed onto the scan target 1, optical properties of the light at a portion that this light reaches are distinct.

The light that may cause the distinct optical properties to occur at the end portion can be blocked by extending, in the main scan direction, the light guide holder 13 disposed on the other end portion of the light guide 21 to cover a portion of the emitter 23 of the light guide 21. Similarly to Embodiments 1 and 2, such extended light guide holder 13 desirably has a distance in the main scan direction that falls into a range in which the extended light guide holder 13 is located over the scatterer 22 of the light guide 21 but not over the sensor 4 that is a scan range of the scan target 1. As illustrated in FIG. 12, the light-shielding member 25 of the light guide holder 13 located over the scatterer 22 enables sufficient blockage of the light leaking from the stepped portion 24 of the light guide 21.

However, the cover 13b of the light guide holder 13 located over the sensor 4 in the main scan direction may block the light reflected by the scan target 1 and cause loss of light to be focused by the lens body 3 toward the sensor 4, which may result in failure of image scanning. Thus the X-axis-direction length of the cover 13b is preferably sufficiently long for the cover 13b to be located over the scatterer 22 of the light guide 21 in the Z-axis direction and not located vertically upward from the sensor 4. Without blocking light necessary for image scanning, this enables blockage of the light that may cause distinct optical properties, and optical properties uniform in the main scan direction can be obtained.

As described above, the image scanning device according to Embodiment 3 includes the linear light source 2 that illuminates the scan target 1 with incoming light. The cut-out like stepped portion 24 is formed at least one of both the ends of the light guide 21 of the linear light source 2, and a member including the light-shielding member 25 is provided on the emitter 23 on the other end portion side of the light guide 21. Furthermore, preferably, a member including the projection 27 that is a light blocking wall for blocking the stepped portion 24 from light is provided. Thus uniform optical properties can be provided without complication or main-scan-direction extension of the linear light source 2, which is an illumination device.

The image scanning device and the illumination device according to Embodiment 3 have the light guide 21 having a surface in the incident surface and a surface opposite thereto that have the same structure, and include the light-shielding member 25, which is a light blocking member, at the emitter 23 located facing the scatterer 22 of the light guide 21. In addition, the projection 27 that is a member with light blocking capabilities is provided.

In each of the image scanning devices and illumination devices according to Embodiments 1 to 3, the light-shielding member 25 is located over the scatterer 22 in the Z-axis direction and not located vertically upward from the sensor 4. This can ensure stable optical properties of both the ends of the illumination device without complication or enlargement of the illumination device.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Scan target (illumination target)
2 Linear light source
3 Lens body (rod lens array)
4 Sensor (sensor element array)
4a Light receiver
4b Drive circuit
5 Sensor board
6 Housing (frame)
6a Opening
6b Flat surface portion
6c Inclined portion
6d Side wall portion
6e Holder mount
6f Opening
7 Infrared cut filter
8 Retaining member (tape, adhesive)
9 White tape
10 External connector
11 ASIC (signal processing IC)
11a A/D conversion circuit
12 Signal processor
12a CPU
12b RAM
12c Signal processing circuit
13 Light guide holder (without light source)
13a, 26a Support
13b, 26b Cover
14 Fastening projection
15 Heat dissipation sheet
16 Light source drive circuit
17 Adhesive
21 Light guide (transparent body)
22 Scatterer
23 Emitter (light emitter)
24 Stepped portion
25 Light-shielding member
26 Light guide holder
27 Projection
28 Light source
29 Light source board

What is claimed is:

1. An image scanning device comprising:
a linear light source to illuminate a linear illumination position of a scan target with light;
a lens body to focus the light from the scan target; and
a sensor to receive the light focused by the lens body,
the linear light source including
a light guide being a rod-like transparent body extending along a main scan direction of the sensor and configured to guide, in the main scan direction, light entering the light guide through an end surface of the transparent body,
a scatterer configured to scatter light and formed along the main scan direction on a surface of the light guide that is opposite to an illumination position side of the light guide,
an emitter formed along the main scan direction on a surface of the light guide between the scatterer and the illumination position and configured to emit the light scattered by the scatterer to the illumination position,
a stepped portion formed, from the end surface of the transparent body along the main scan direction, on a side of the light guide that is opposite to the illumination position side of the light guide, and
a light-shielding member covering a portion of the emitter of the light guide, the portion including the end surface of the transparent body, the light-shielding member extending beyond the stepped portion in the main scan direction and having an end portion that is located out of a scan range of the sensor in the main scan direction.

2. The image scanning device according to claim 1, wherein the linear light source further includes a light guide holder covering the end surface of the transparent body and supporting the light guide.

3. The image scanning device according to claim 2, wherein the light guide holder includes the light-shielding member.

4. The image scanning device according to claim 3, wherein the light guide holder includes a projection corresponding to the stepped portion.

5. The image scanning device according to claim 4, wherein the projection is a light blocking member.

6. The image scanning device according to claim 5, wherein the light guide holder has a structure dividable into a portion in which the light-shielding member is formed and a portion in which the projection is formed.

7. The image scanning device according to claim 6, wherein the portion in which the light-shielding member is formed covers the portion in which the projection is formed.

8. The image scanning device according to claim 4, wherein the light guide holder has a structure dividable into a portion in which the light-shielding member is formed and a portion in which the projection is formed.

9. The image scanning device according to claim 8, wherein the portion in which the light-shielding member is formed covers the portion in which the projection is formed.

10. An image scanning device comprising:
a linear light source to illuminate a linear illumination position of a scan target with light;
a lens body to focus the light from the scan target; and
a sensor to receive the light focused by the lens body,
the linear light source including
a light guide being a rod-like transparent body extending along a main scan direction of the sensor and configured to guide, in the main scan direction, light entering the light guide through an end surface of the transparent body,
a scatterer configured to scatter light and formed along the main scan direction on a surface of the light guide that is opposite to an illumination position side of the light guide,
an emitter formed along the main scan direction on a surface of the light guide between the scatterer and the illumination position and configured to emit the light scattered by the scatterer to the illumination position,
a stepped portion formed, from the end surface of the transparent body along the main scan direction, on a side of the light guide that is opposite to the illumination position side of the light guide, the stepped portion inclining relative to the main scan direction, and
a light-shielding member covering a portion of the emitter of the light guide, the portion including the end surface of the transparent body, the light-shielding member extending beyond the stepped portion in the main scan direction and having an end portion that is located out of a scan range of the sensor in the main scan direction.

11. The image scanning device according to claim 10, wherein the linear light source further includes a light guide holder covering the end surface of the transparent body and supporting the light guide, and the light guide holder includes the light-shielding member and a projection corresponding to the stepped portion.

12. The image scanning device according to claim 11, wherein the stepped portion has an angle of inclination of 7° or less relative to the main scan direction.

13. The image scanning device according to claim 10, wherein the stepped portion has an angle of inclination of 7° or less relative to the main scan direction.

* * * * *